United States Patent [19]

Meysenburg

[11] 4,143,815

[45] Mar. 13, 1979

[54] HEATING APPARATUS

[75] Inventor: Helmut Meysenburg, Heiligenhaus, Fed. Rep. of Germany

[73] Assignee: Energietechnik GmbH, Essen, Fed. Rep. of Germany

[21] Appl. No.: 888,327

[22] Filed: Mar. 20, 1978

Related U.S. Application Data

[63] Continuation of Ser. No. 735,006, Oct. 22, 1976, abandoned.

[30] Foreign Application Priority Data

Oct. 22, 1975 [DE] Fed. Rep. of Germany ....... 2547214

[51] Int. Cl.² .............................................. F24J 3/02
[52] U.S. Cl. .................................... 237/2 B; 126/270; 62/238
[58] Field of Search ...................... 126/270; 98/37, 31; 237/1 A, 2 B; 165/55; 62/2, 238 E

[56] References Cited

U.S. PATENT DOCUMENTS

| 246,626 | 9/1881 | Morse | 237/1 A |
|---|---|---|---|
| 1,467,005 | 9/1923 | Lawrence | 98/31 X |
| 2,559,869 | 7/1951 | Gay | 237/1 A |
| 3,231,986 | 2/1966 | Touton | 98/31 X |
| 3,832,992 | 9/1974 | Trombe et al. | 237/1 A |
| 3,952,947 | 4/1976 | Saunders | 237/1 A |

Primary Examiner—William E. Wayner
Attorney, Agent, or Firm—Karl F. Ross

[57] ABSTRACT

An apparatus for the utilization of air and solar energy and for the recovery of heat, e.g. in a building, comprises a heat exchanger formed along a wall of the building structure which, on the one side, is heated by lost heat from the building and, on the other side, is heated by solar energy. Air is inducted to flow from the ambient environment through the heat exchanger to be heated by solar and lost-heat energy and then passes to a heat exchanger, preferably forming part of a heat pump, from the thermal energy of which air is recovered and used, e.g. for heating the building.

10 Claims, 6 Drawing Figures

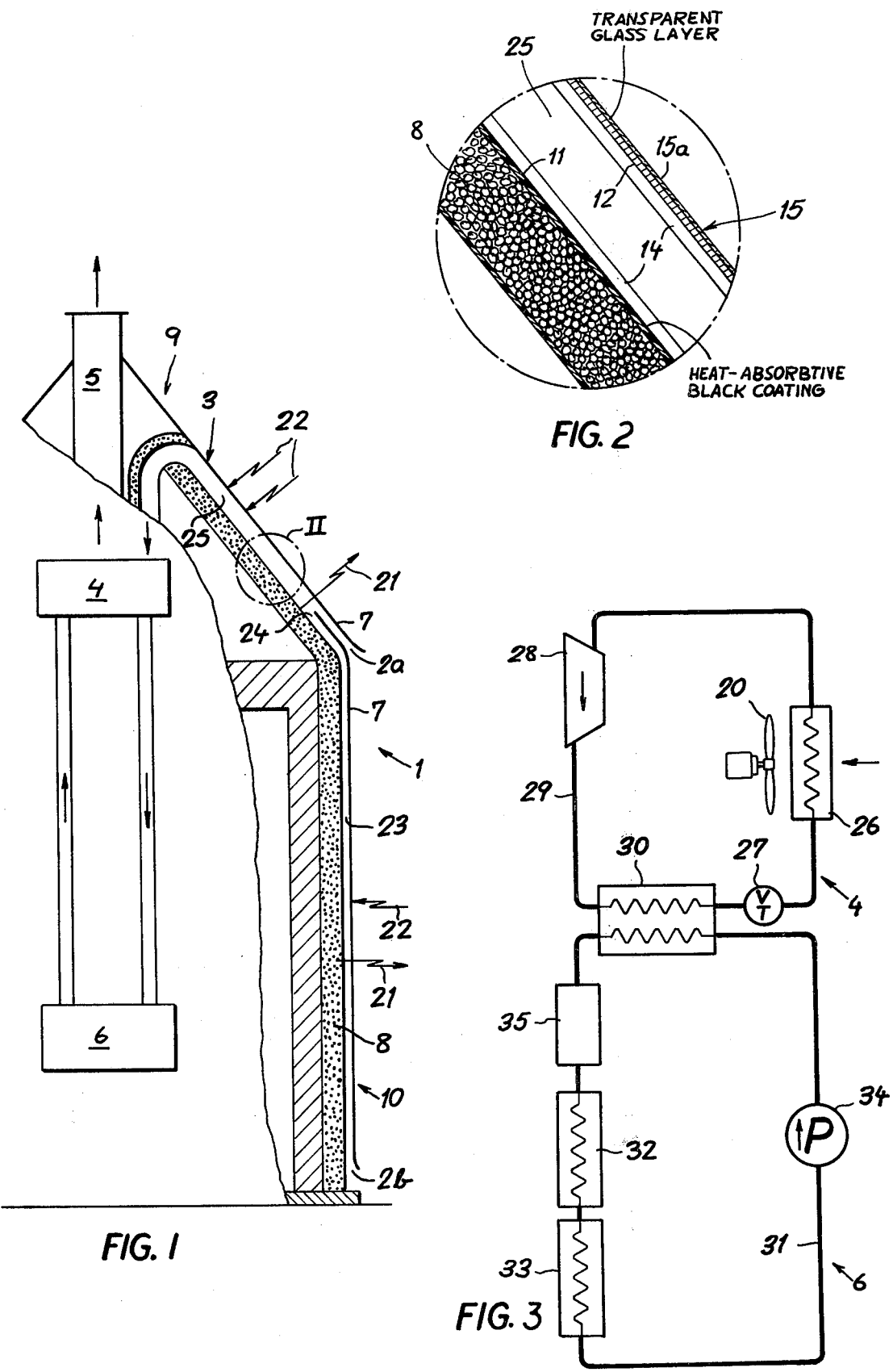

HEATING APPARATUS

This is a continuation of application Ser. No. 735,006, filed Oct. 22, 1976, now abandoned.

FIELD OF THE INVENTION

The present invention relates to a heating apparatus for a building and, more particularly, to an apparatus for heating a structure in which lost-heat energy from the structure, solar energy impinging upon the structure and energy in the ambient air are simultaneously recovered and utilized.

BACKGROUND OF THE INVENTION

With increasing energy cost, considerable attention has been directed to developing alternative forms of energy, i.e. forms of energy which will permit the heating of a building, using other than conventional fuels and electrical energy.

For example, it is known that a considerable amount of heat is lost through the walls of a building which, even if insulated, constitute a significant radiator of thermal energy, especially when the temperature differential across the wall is considerable. In temperate and like weather zones, the temperature differential across the walls of a heated structure, especially in the wintertime, can be tens of degrees celsius thereby driving thermal energy from the interior outwardly and causing a significant loss of heat unless this so-called lost energy can be recovered.

It is also known that a considerable amount of thermal energy is available from solar energy impinging upon the large surface areas of building structures. Finally, in many cases the ambient atmosphere contains recoverable thermal energy. Such thermal energy may be in the form of warm air adjacent the building.

Various techniques have been proposed to recover and/or utilize and/or conserve these quantities of thermal energy. Thus, for example, the walls of the building structure may be highly insulated to prevent loss of heat to the external environment. Solar energy systems may be provided, e.g. on roof structures, to convert the impinging solar energy radiation into a heated fluid or the like whose sensible heat can be effectively utilized.

However, in practice it has not been found to be advantageous, convenient or desirable to utilize the thermal energy of the air and even the utilization of solar energy has been minimal because of the considerable costs of so-called solar energy converters as have been proposed heretofore.

In German published application (Offenlegungsschrift) DT-OS No. 2,511,861, for example, there has been described an apparatus permitting the utilization of solar energy in combination with a building structure. In this system, an air inlet is provided and a blower or the like draws ambient air through a first heat exchanger which is exposed to the solar energy so that the warm air can be fed to a second heat exchanger forming part of the heat-utilization system.

While this arrangement effectively permits some utilization of solar energy, it is relatively inefficient and has not proved to be fully satisfactory.

OBJECTS OF THE INVENTION

It is the principal object of the present invention to improve upon the aforedescribed solar-energy-recovery system and permit greater utilization of thermal energy in the environs of a building structure.

Another object of the invention is to provide an improved heating plant or apparatus for a building.

SUMMARY OF THE INVENTION

I have now found that it is possible to provide an apparatus which permits the simultaneous recovery of heat from ambient air (air energy) and solar radiation (solar energy) and from the otherwise lost heat of a building structure in a convenient and economical manner, thereby increasing the efficiency and effectiveness of a thermal energy plant for the heating of buildings and the like.

According to the present invention, the aforementioned first heat exchanger is so constructed and arranged that it receives at least part of the recoverable lost heat from the building and transfers this heat to the airstream traversing the first heat exchanger. This system thus differs in two significant points from the prior-art apparatus described above. Firstly, the initial heat exchanger allows a recovery of the wave heat from the building and secondly, the recoverable heat from the building is transferred to the second heat exchanger in the path of the air stream directly downstream of the first heat exchanger.

Thus the air sucked through the first heat exchanger, according to the invention, serves as a transport fluid for the solar energy and is further heated along surfaces of the first heat exchanger at which the lost heat from the building is recovered to permit simultaneous exploitation of the air energy, solar energy and lost energy from the building. The air is thereby brought to a higher temperature to allow more efficient recovery of heat therefrom and hence better utilization of the air energy and solar energy.

According to a feature of the invention, the first heat exchanger forms part of the building skin or shell of the structure to be heated with a wall of this first heat exchanger simultaneously forming a wall of the building. In this case, the building can be provided with a heat exchanger body (buffer body), in addition to or in place of the usual insulating wall, the purpose of this body being to permit heat which penetrates through the internal walls of the building structure and any insulation thereof, to be transferred to the air stream contacting this heat exchange body. This body may be a thermally conductive material and can have heat-storing capacity, i.e. a relatively high heat capacity. The body may extend over roof and wall portions of the building so that any heat tending to pass out of the building structure can be transformed by this body to the air traversing the first heat exchanger to rais the temperature of this air.

It is possible, with the present invention, to provide the outer wall of the first heat exchanger substantially transparent to solar radiation, thereby enabling the raidant energy to be absorbed by the aforementioned body and transferred to the air thereby. Alternatively, the external surface of the first heat exchanger can itself be a thermally absorbing structure which transfers heat to the air stream directly. In the first case, the aforementioned body will serve to transfer heat to the air from the building and, in addition, from the solar energy. In the latter case, the body will transfer heat to the air only from the building while the solar energy is transferred to the air from the opposite wall of the first heat exchanger. In all cases, the first heat exchanger may cover all or part of the roof of the building and/or all or part of the vertical walls (side walls) thereof.

If the body is to absorb the solar energy, it can be provided with a blackened or heat-absorbing layer and, if the opposite wall of the heat exchanger is intended to constitute the heat-absorbing surface, it may be provided with the heat-absorbing blackened layer.

According to another feature of the invention, the first heat exchanger, i.e. the heat exchanger through which the air is drawn in and which is used to recover at least part of the recoverable outward heat flow of the building and/or the impinging solar energy, is formed on the external walls and roof of the building by applying to the wall thereof a heat-transferring body of the aforedescribed type and spacing the external wall of the heat exchanger from this body. The inner wall of the heat exchanger is thus directly formed by an outer wall of the corresponding building. This body serves as a thermal conductor for transmitting heat to the air transversing the heat exchanger.

It is possible, in accordance with the invention, to control the system and, thereby, obtain optimum results, by providing means for varying the flow cross-section of the air inlets and/or the cross-section of the first heat exchanger. It is also possible to provide adjustable means for guiding the air flow through the first heat exchanger in an optimum way, i.e. by increasing or decreasing the effective path length of the airstream through the first heat exchanger. It is thus possible to regulate the airflow and the flow paths for optimum results.

Advantageously, the second heat exchanger is constituted as a heat pump and/or the heat-consuming system is constituted as a hot-water circulating system. Between the second heat exchanger and the heat consumer, I prefer to provide a heat-storage means.

BRIEF DESCRIPTION OF THE DRAWING

The above and other objects, features and advantages of the present invention will become more readily apparent from the following description, reference being made to the accompanying drawing in which:

FIG. 1 is a diagrammatical vertical section through a residential building provided with the system of the present invention;

FIG. 2 is a detail view, drawn to an enlarged scale, of the portion of the heat exchanger represented at II in FIG. 1;

FIG. 3 is a diagram illustrating the heat-consuming and second heat exchanger system of the apparatus of FIG. 1;

SPECIFIC DESCRIPTION

Figure 4:
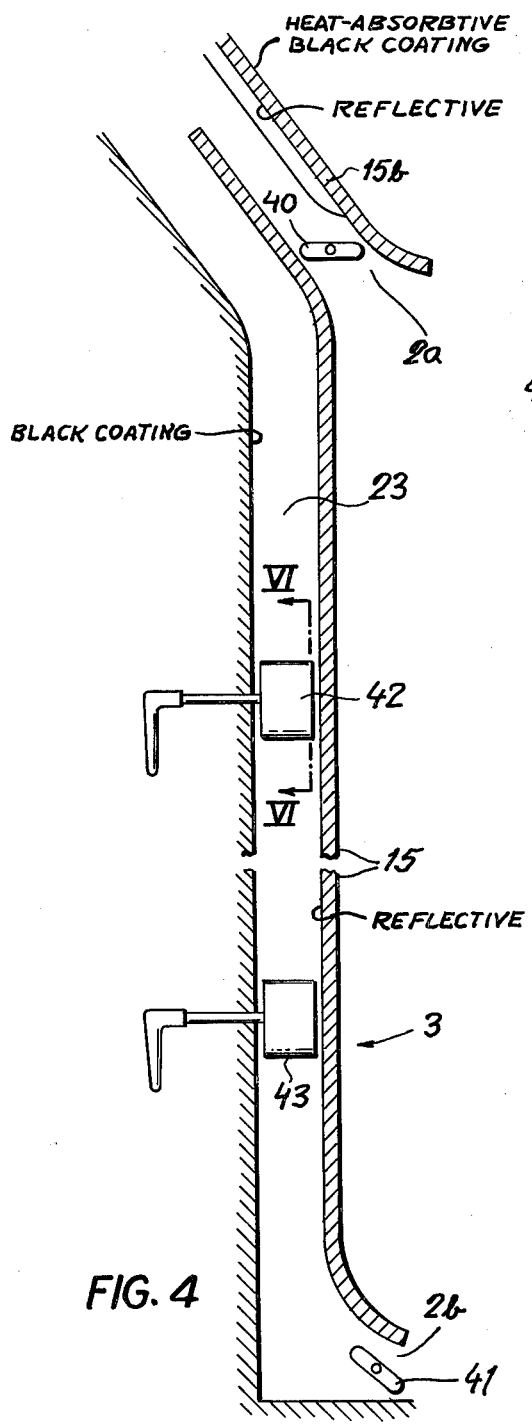
FIG. 4 is a detail view of a portion of the first heat exchanger.

In FIG. 1 of the drawing, I have shown a building 1, diagrammatically represented as a residential structure, which also can be considered to be an office, factory or institutional building. According to the invention, a pair of air inlets 2a and 2b are provided at the eaves of the roof and at the base of the vertical walls of the building to allow a blower 20 (FIG. 3) to draw air into the first heat exchanger which is generally designated at 3 and is traversed by the air. At least part of the outwardly lost heat (represented at 21) is thus absorbed by the airstream which acts as a thermal carrier, while at least part of the impinging solar radiation 22, transformed into heat, is also carried with the airstream which itself may be a carrier of thermal energy around the building. The passage 23 of the heat exchanger 3, along the vertical walls of the building, opens at its upper end 24 into the passage 25 of the heat exchanger 3 along the roof so that the blower 20 draws air in through both inlets 2a and 2b.

The warmed air is carried to a second heat exchanger 26 forming part of a heat pump 4 which transfers the heat to a heat consumer represented at 6 and preferably constituting a hot-water circulating system for heating the building. Waste air, i.e. air from which heat has been abstracted, is discharged through the chimney 5.

As can be seen from FIG. 3, the heat pump 4 comprises the second heat exchanger 26 which removes thermal energy from the gas and is connected downstream of a throttle 27 and upstream of a compressor 28 forming a recirculating path 29 for a heat pump fluid such as a Freon or other liquefiable gas. The thermal energy of the heat pump is transferred at a heat exchanger 30 to the hot-water circulation 31 of the heat consumer 6. The heat pump 4, of course, operates in the conventional manner to transfer heat from the air to the hot water of the heat consumer 6.

The hot-water circulating system 6 can comprise, in addition, radiators 32 and 33 serving to heat the rooms of the building 1, a pump 34 for circulating the hot water, and, between the heat pump 4 and the radiators 32 and 33 of the heat consumer, a heat storage means 35 which can simply be constituted as a water tank.

In the embodiment illustrated, the outer walls 7 of the building form the outer walls 7 of the first heat exchanger 3 and within the building there is disposed a buffer body or wall 8 forming the inner wall of the first heat exchanger 3. The buffer body and first heat exchanger thus extend along both the roof 9 and a portion of the facade 10 of the building. The buffer body 8 is provided with a heat-absorptive coating 11, e.g. of black paint, and can be provided with ribs 14 to improve thermal conduction to the air traversing the passage 25. In this case, moreover, the outer walls 15 of the heat exchanger, is also provided with ribs 14, is made practically transparent to solar radiation and may be constituted by a glass layer 15a lying along a thin sheet-metal member 12 carrying the ribs 14. The inner surface of the glass layer 15a may be provided with a heat-reflecting coating.

Figure 5:
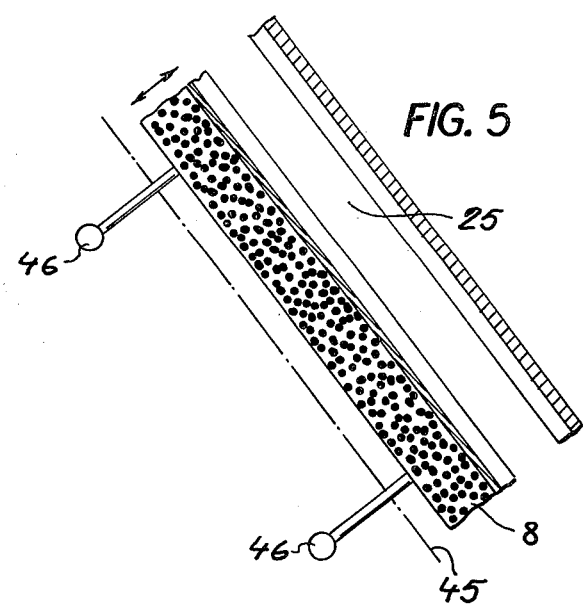
FIG. 5 is a detail view of another embodiment of the invention.
Figure 6:
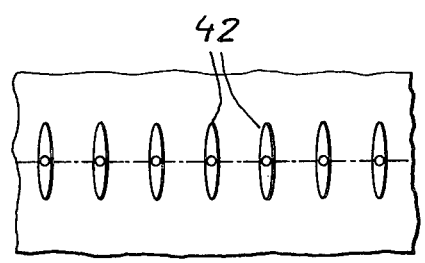
FIG. 6 is a view taken along line VI — VI of FIG. 4, partly broken away.

As can be seen from FIG. 4, the outer surface of the outer wall 15 may also be provided with a heat absorptive or black coating 15b if desired. At the inlets 2a and 2b of the first heat exchanger 3, swingable vanes 40 and 41 can be provided to adjust the throughflow cross-section within the passages, e.g. passages 23, there can be provided louvres 42 and 43 (also seen in FIG. 6) constituting airstream guides for increasing or decreasing the effective path length of the air traversing the passages of the heat exchanger. Finally the body 8 can be movable relative to the outer wall 45 of the building, e.g. by handles 46 (FIG. 5) to modify the flow cross-section of the passage 25 if desired. The buffer body 8 in the embodiments illustrated can constitute flexible panels filled with aluminum particles or other heat-absorptive material.

I claim:

1. A heating apparatus for a building, comprising:

a first heat exchanger in the form of a duct disposed along a wall of said building and having an air inlet open to the exterior, said first heat exchanger being arranged and constructed to transfer heat lost through said wall of the building and solar energy impinging upon said wall of the building to air traversing said first heat exchanger;

means for inducing the flow of air from the exterior through said first heat exchanger whereby said air is heated by the heat lost from said building and the solar energy impinging thereon;

a second heat exchanger traversed by the heated air downstream of said first heat exchanger for abstracting heat from the heated air;

a heat consumer connected to said second heat exchanger and utilizing the heat abstracted therein from the air traversing said first heat exchanger;

a heat-absorbing buffer body within said duct in heat-exchanging relationship with the air traversing said first heat exchanger and with a first heat exchanger wall spaced from said body and defining an airflow passage of said duct therewith;

a thermally absorbent surface blackened on said buffer body confronting said first heat exchanger wall; and a heat-reflective coating on an inner surface of said first heat exchanger wall confronting said thermally absorbent surface.

2. The apparatus defined in claim 1, further comprising means for varying the airflow cross-section of said inlet.

3. The apparatus defined in claim 1 wherein said first heat exchanger extends over at least a portion of the roof of said building and over at least a portion of a vertical wall thereof.

4. The apparatus defined in claim 1 wherein said first heat exchanger wall is provided externally with a black heat-absorbing coating.

5. The apparatus defined in claim 1 wherein the walls of said passage in contact with the air traversing same are provided with ribs promoting heat exchange to said air.

6. The apparatus defined in claim 1, further comprising means for varying the flow cross-section of said first heat exchanger.

7. The apparatus defined in claim 1, further comprising flow-control means in said first heat exchanger for adjustably varying the path of air traversing the same.

8. The apparatus defined in claim 1 wherein said second heat exchanger forms part of a heat pump.

9. The apparatus defined in claim 1 wherein said heat consumer forms part of a circulated water-heating system.

10. The apparatus defined in claim 1, further comprising a heat-storage means between said second heat exchanger and said heat consumer.

* * * * *